United States Patent
Park

(10) Patent No.: US 8,930,630 B2
(45) Date of Patent: Jan. 6, 2015

(54) CACHE MEMORY CONTROLLER AND METHOD FOR REPLACING A CACHE BLOCK

(75) Inventor: Gi Ho Park, Seoul (KR)

(73) Assignee: Sejong University Industry Academy Cooperation Foundation, Seoul (KR)

( * ) Notice: Subject to any disclaimer, the term of this patent is extended or adjusted under 35 U.S.C. 154(b) by 175 days.

(21) Appl. No.: 13/376,271

(22) PCT Filed: Sep. 2, 2009

(86) PCT No.: PCT/KR2009/004940
§ 371 (c)(1),
(2), (4) Date: Dec. 5, 2011

(87) PCT Pub. No.: WO2010/140738
PCT Pub. Date: Dec. 9, 2010

(65) Prior Publication Data
US 2012/0084515 A1 Apr. 5, 2012

(30) Foreign Application Priority Data
Jun. 5, 2009 (KR) .......................... 10-2009-0049731

(51) Int. Cl.
*G06F 12/12* (2006.01)

(52) U.S. Cl.
CPC ............ *G06F 12/127* (2013.01); *G06F 12/128* (2013.01)
USPC ........... 711/134; 711/136; 711/159; 711/160; 711/E12.017; 711/E12.07; 711/E12.072

(58) Field of Classification Search
CPC ............................. G06F 12/127; G06F 12/128
See application file for complete search history.

(56) References Cited

U.S. PATENT DOCUMENTS

| | | | | |
|---|---|---|---|---|
| 5,537,588 A * | 7/1996 | Engelmann et al. | ........... | 711/144 |
| 6,223,256 B1 * | 4/2001 | Gaither | ......................... | 711/134 |
| 7,251,710 B1 * | 7/2007 | Isaac et al. | ..................... | 711/118 |
| 7,366,855 B2 * | 4/2008 | Kim et al. | ..................... | 711/160 |
| 8,024,517 B2 * | 9/2011 | LaFrese et al. | ............... | 711/113 |

OTHER PUBLICATIONS

Korean Office action for 10-2009-0049731 dated Nov. 23, 2010.
Park, et al., "CFLRU: A Replacement Algorithm for Flash Memory" 2006, Seoul, Korea, Division of Computer Science, Korea Advanced Institute of Science and Technology, Oct. 2006.

* cited by examiner

*Primary Examiner* — Christian P Chace
*Assistant Examiner* — Eric Loonan
(74) *Attorney, Agent, or Firm* — Pearne & Gordon LLP

(57) ABSTRACT

The present disclosure relates to a cache memory controller for controlling a set-associative cache memory, in which two or more blocks are arranged in the same set, the cache memory controller including a content modification status monitoring unit for monitoring whether some of the blocks arranged in the same set of the cache memory have been modified in contents, and a cache block replacing unit for replacing a block, which has not been modified in contents, if some of the blocks arranged in the same set have been modified in contents.

4 Claims, 3 Drawing Sheets

CACHE MEMORY CONTROLLER AND METHOD FOR REPLACING A CACHE BLOCK

TECHNICAL FIELD

The present disclosure relates to a cache memory controller for controlling a set-associative cache memory, in which two or more blocks are included in a same set, and a method for replacing a cache block.

BACKGROUND ART

In general, the improvement in the processing speed of a memory is very slow compared to the improvement in the processing speed of a central processing unit (CPU). Thus, there is a speed gap between a CPU and a lower memory. In order to overcome the difference, most systems have adopted a cache memory structure.

In a structure using a cache memory, upon accessing data, if the content requested by the CPU is present in the cache memory, the data accessing is successfully carried out without any problems. However, if the content requested by the CPU is not present in the cache memory, a cache miss occurs.

When the cache miss occurs, in order to make the content present in the cache memory, a cache block should be replaced by fetching a block from a lower memory and storing the block in the cache memory.

The algorithms for the cache block replacement include LRU (Least Recently Used), Random, and Pseudo LRU algorithm, etc., which were designed to improve the system performance by replacing a cache block which is less likely to be reused.

Among them, the LRU algorithm replaces the block which has been the least recently referenced, among a plurality of replaceable cache blocks in the same set. The LRU algorithm was invented based on the idea that the block which has been the least recently referenced, or not recently referenced, is less likely to be reused in the future.

In these conventional LRU algorithms, when a cache block is referenced by the CPU, the block becomes the block which has been the most recently referenced in the set, or the MRU (Most Recently Used) block, and in case of a 2-way set-associative cache, the other block becomes the block which has been the least recently referenced, or the LRU (Least Recently Used) block. Therefore, the LRU block information can be stored in the LRU bit in the tag array. For example, if the LRU block is a block stored in way 0, 0 is stored in the LRU bit, and if the LRU block is a block stored in way 1, 1 is stored in the LRU bit. In the case that a cache miss occurs and a block needs to be fetched from the lower memory and stored in the cache, in order to store the newly fetched block, by referring to the LRU bit in the cache memory, it is determined which block stored in the cache memory needs to be replaced. If 0 is stored in the LRU bit, a cache block stored in way 0 is selected as the block to be replaced, and if 1 is stored in the LRU bit, a cache block stored in way 1 is selected as the block to be replaced.

However, in these conventional cache block replacement algorithms, even when the block to be replaced has been modified since it had been stored in the cache memory, the need for storing the replaced block in the lower memory through the write buffer is not considered, and the block to be replaced is determined only based on the information as to which block has been accessed the recently.

Also, in the conventional cache block replacement algorithms, when a failure in referring to a cache occurs and a cache block needs to be replaced, a time delay may occur as the block to be replaced may be a dirty block and should be stored in the write buffer, but the write buffer is full so the system should wait until some space becomes available in the write buffer The problems of the conventional cache block replacement algorithms may more frequently occur in the latest systems using a plurality of CPUs, due to the increase in the CPU operation speed, the broader gap in the operation speed between the CPU and the memory, and the cache misses occur more intensely during a shorter time period when dealing with the data having burst characteristics.

DISCLOSURE OF THE INVENTION

Problems to Be Solved by the Invention

One embodiment of the present disclosure provides a cache memory controller and a method for replacing a cache block, in which if blocks stored in a write buffer reach at least a certain level, and some of blocks stored in a cache memory have been modified in contents, a clean block, which has not been modified in contents, is selected as a block to be replaced.

Means for Solving the Problems

As technical means to solve the foregoing problems, a first aspect of the present disclosure provides a cache memory controller for controlling a set-associative cache memory, in which two or more blocks are arranged in the same set, the cache memory controller including a content modification status monitoring unit for monitoring whether some of the blocks arranged in the same set of the cache memory have been modified in contents, and a cache block replacing unit for replacing a block, which has not been modified in contents, if some of the blocks arranged in the same set have been modified in contents.

As technical means to solve the foregoing problems, a second aspect of the present disclosure provides a method for replacing a cache block of a set-associative cache memory, in which two or more blocks are arranged in the same set, the method including (a) determining whether a data array includes a dirty block, based on a dirty bit of a tag array, and (b) replacing a clean block, if some of the two or more blocks arranged in the same set include a dirty block.

Effect of the Invention

According to one of the above-described technical means to solve the problems, in the current status of the write buffer, namely, if the write buffer reaches at least a certain level, a clean block, and not a dirty bit, among replaceable blocks is preferentially selected as a block to be replaced. Accordingly, it is possible to fetch a new block from the lower memory and store the block in the cache memory without undergoing time delay to wait for storage in the write buffer.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

BEST MODE FOR CARRYING OUT THE INVENTION

Figure 1:
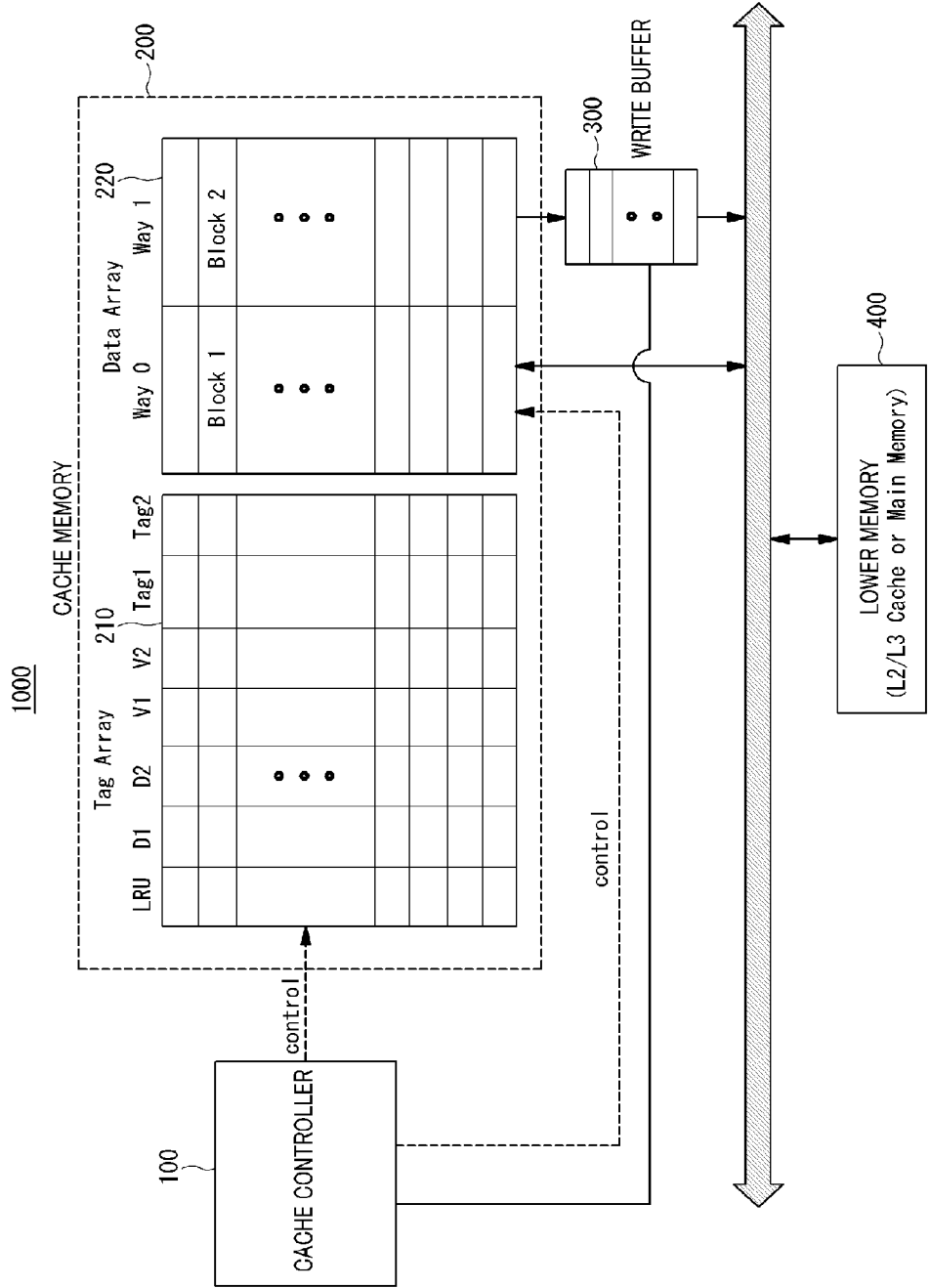
FIG. 1 is a view showing a cache memory system according to one embodiment of the present disclosure.

Hereinafter, embodiments in accordance with the present disclosure will be described in detail by reference to the accompanying drawings so that the present disclosure may be readily implemented by those skilled in the art. However, it is to be noted that the present disclosure is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Hereinafter, a cache memory controller and a method for replacing a cache block according to one embodiment of the present disclosure will be described referring to FIGS. 1 to 3.

FIG. 1 is a diagram illustrating a cache memory system according to one embodiment of the present disclosure. FIG. 1 suggests a cache system using an LRU (Least Recently Used) cache replacement algorithm for a 2-way set-associative cache.

Referring to FIG. 1, a cache memory system 1000 according to one embodiment of the present disclosure includes a cache memory controller 100, a cache memory 200, a write buffer 300, and a lower memory 400. The cache memory 200 includes a tag array 210 and a data array 220.

In the case that a cache miss occurs and a block needs to be fetched from the lower memory 400 and stored in the cache memory 200, the cache memory controller 100 selects the cache block to be replaced based on the status of the write buffer 300.

In particular, in the case that the number of cache blocks stored in the write buffer 300 is higher than a certain level, referring to the dirty bits (D1 and D2) regarding the block, which are stored in the tag array 210 of the cache memory 200, the cache memory controller 100 lets the block be stored in the lower memory 400 by storing the block into the write buffer 300 if the block has been modified since it had been fetched and stored. However, if the block is a clean block, which means it has not been modified since it had been fetched and stored, the cache memory controller 100 replaces the block with a newly fetched block without storing the clean block into the write buffer 300 to fetch a new block in response to the cache miss.

The cache memory 200 is positioned between the central processing unit (not illustrated) and the lower memory 400, and is a high-speed memory storing only frequently accessed parts of the lower memory data to speed up the memory access by the central processing unit. Generally, the cache memory 200 is configured by a plurality of blocks and performs read and write operations by the block.

The cache memory 200 includes the tag array 210 which indicates the address of a block stored in the cache memory 200 and the status of the data stored therein, and the data array 220 which stores data.

The tag array 210 includes an LRU (Least Recently Used) bit which stores the recent reference information of the blocks stored in the cache memory 200, tags (Tag1 and Tag2) which represent part of the address of each block stored in the cache memory 200, valid bits (V1 and V2) which indicate whether or not the block is valid, and dirty bits (D1 and D2) which indicate whether or not the value of the block has been changed since the block had been fetched and stored in the cache memory 200.

The write buffer 300 is positioned between the cache memory 200 and the lower memory 400 and when the data in the cache memory 200 has been modified it transfers the data to the lower memory 400.

The lower memory 400 may be implemented by the main memory or lower level cache memories than the cache memory 200 in the hierarchical structure (L2 and L3 etc.) for storing data used by the CPU in executing a variety of instructions such as control operations.

Figure 2:
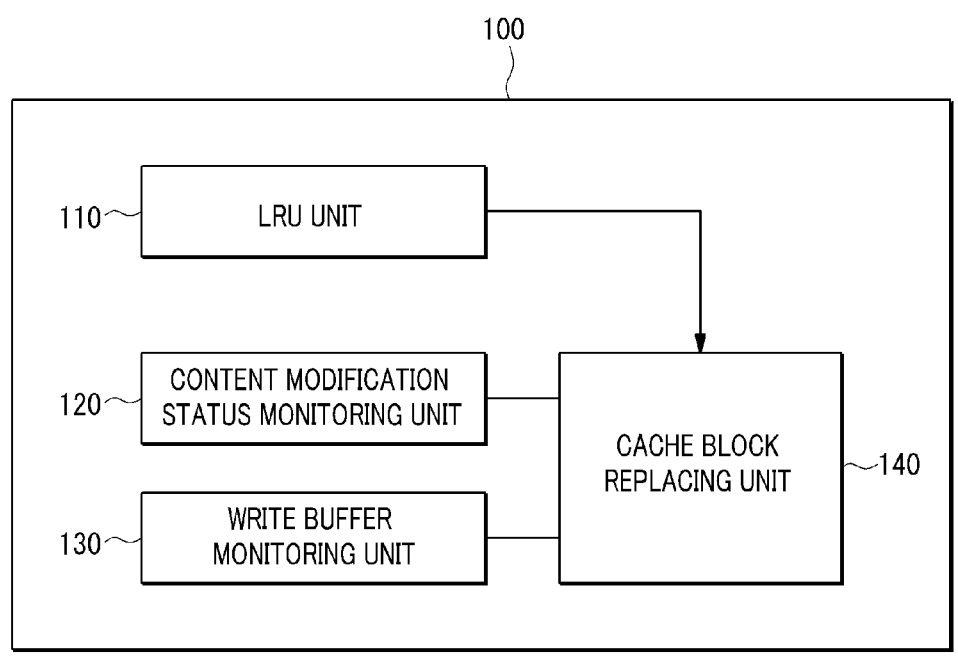
FIG. 2 is a detailed configuration view of a cache memory controller according to one embodiment of the present disclosure.

FIG. 2 is a detailed block diagram of a cache memory controller according to one embodiment of the present disclosure.

Referring to FIG. 2, the cache memory controller 100 according to one embodiment of the present disclosure includes an LRU unit 110, a content modification status monitoring unit 120, a write buffer monitoring unit 130, and a cache block replacing unit 140.

In selecting the block to be replaced among the blocks stored in the cache memory 200, the LRU unit 110 performs an LRU (Least Recently Used) algorithm which selects the block that has been the least recently referenced as the block to be replaced. That is, in the case that a cache miss occurs and a block needs to be fetched from the lower memory and stored in the cache memory, in order to store the newly fetched block in the cache memory 200, the LRU unit 110 refers to the LRU bit in the cache memory 200 and selects a cache block stored in way 0 as the block to be replaced if 0 is stored in the LRU bit. And if 1 is stored in the LRU bit, the LRU unit 110 selects a cache block stored in way 1 as the block to be replaced.

The content modification status monitoring unit 120 monitors whether some of the blocks in the cache memory 200 have been modified in content. In other words, the content modification status monitoring unit 120 monitors whether there is a block among the blocks stored in the cache memory 200 which has been modified in content when the cache block is referenced by the central processing unit.

Specifically, the content modification status monitoring unit 120 monitors whether the data array includes a dirty block based on the values of the dirty bits of the tag array 210 in the cache memory 200.

The write buffer monitoring unit 130 monitors whether the number of cache blocks stored in the write buffer 300 is higher than a predetermined threshold. That is, the write buffer monitoring unit 130 monitors whether the number of cache blocks stored in the write buffer 300 is higher than a certain level (ex: whether higher than $2/3$ or $1/2$, or whether the write buffer 300 is full).

In the case that some of the blocks stored in the cache memory 200 have been modified in content, the cache block replacing unit 140 replaces a clean block which has not been modified in content. That is, based on the output of the write buffer monitoring unit 130, if the number of cache blocks stored in the write buffer 300 is lower than a predetermined threshold (k), the write buffer monitoring unit 130 replaces a block by performing an LRU algorithm, and if the number of cache blocks stored in the write buffer 300 is higher than or equal to the threshold (k), the write buffer monitoring unit 130 replaces a clean block which has not been modified in content. For example, with the conventional LRU replacement policies, the write buffer monitoring unit 130 should select a block stored in way 1 as the block to be replaced when 1 is stored in the LRU bit, while in the present disclosure, when a cache block in way 1 is a dirty block and a cache block in way 0 is a clean block, the cache block replacing unit 140 selects the block in way 0 as the block to be replaced and stores the newly fetched block in way 0.

In the case that all blocks in the cache memory 200 have been modified in content, the cache block replacing unit 140 replaces a block by performing an LRU algorithm. For example, if all cache blocks in way 1 and way 2 are dirty blocks, the cache block replacing unit 140 selects the LRU block as the block to be replaced by using an conventional LRU algorithm.

If there are a plurality of clean blocks in a set-associative cache with 4 or higher associativity (ex: 4-way, 8-way, etc.) or a fully associative cache, the block to be replaced is selected from the clean blocks by applying the LRU algorithm for the clean blocks.

A 2-way set-associative cache memory has been described here as an example of the cache memory 200 according to one embodiment of the present disclosure. However, the present disclosure should not be limited thereto. A 4-way set-associative cache memory or a fully associative cache memory may be adopted.

As aforementioned, according to one embodiment of the present disclosure, by selecting a clean block not a dirty block among the candidate blocks as the block to be replaced if the number of cache blocks stored in the write buffer 300 is higher than or equal to a certain level, the cache memory controller 100 can fetch a new block from the lower memory 400 and store the block in the cache memory 200 without having to wait for the data to be stored in the write buffer 300.

Performing an LRU (Least Recently Used) algorithm by the LRU unit 110 according to one embodiment of the present disclosure has been described. However, the present disclosure should not limited to the LRU algorithm, and those having ordinary skill in the art can easily understand that other cache replacement algorithms may be adopted.

Figure 3:
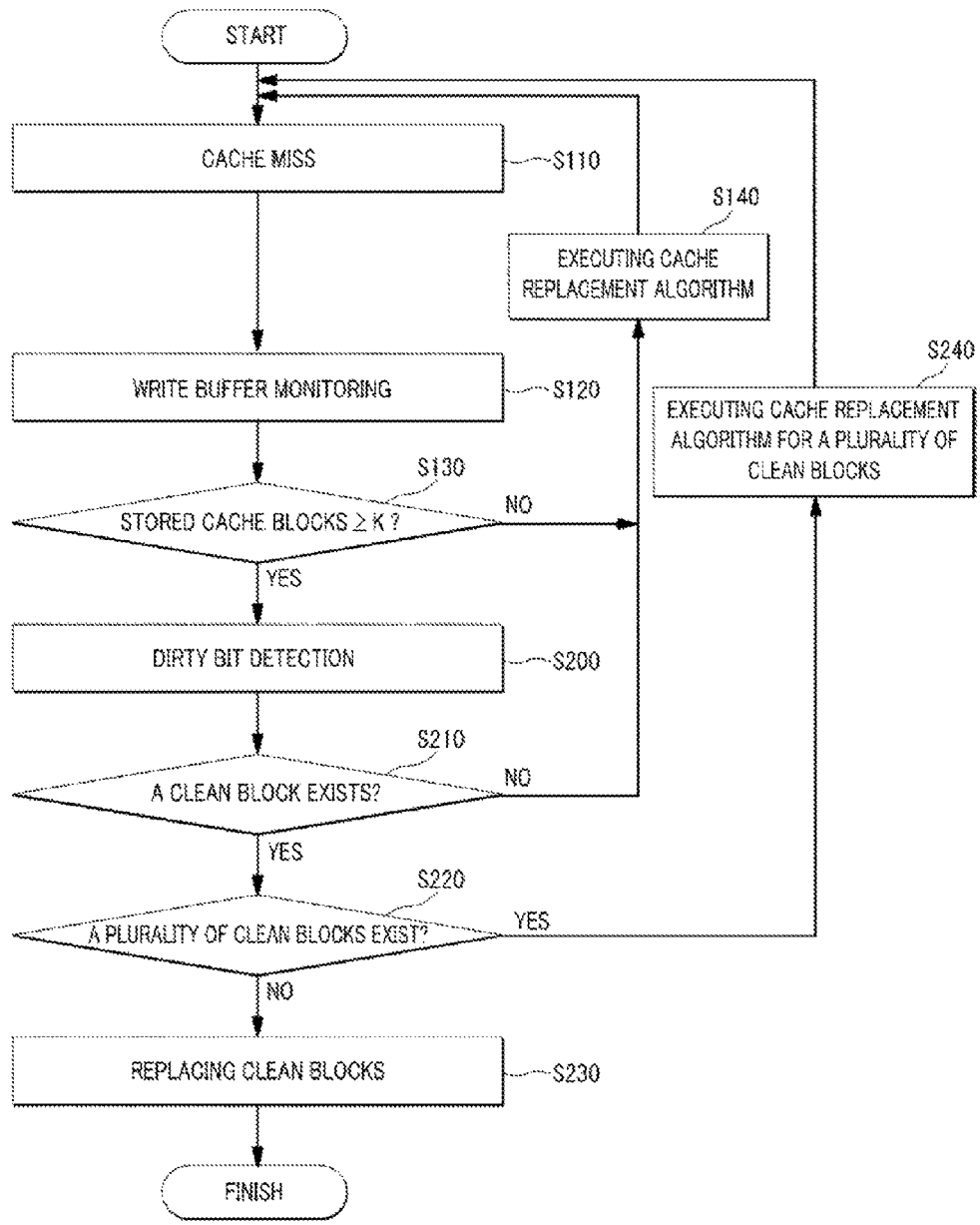
FIG. 3 is a flow chart for explanation of a method for replacing a cache block according to one embodiment of the present disclosure.

FIG. 3 is a flow chart illustrating a method for replacing a cache block according to one embodiment of the present disclosure.

First, At S110, if the content requested by the central processing unit is not present in the cache memory, namely, if a cache miss occurs, the cache controller 100 proceeds to S120 and monitor the write buffer 300.

At S130, the cache memory controller 100 determines whether the number of cache blocks stored in the write buffer 300 is higher than a certain level (k) (ex: whether higher than ⅔ or ½, or whether the write buffer 300 is full).

If the result of S130 shows the number of cache blocks stored in the write buffer 300 is lower than a certain level (k), the cache memory controller 100 proceeds to S140 and replace a cache block by performing a conventional LRU (Least Recently Used) algorithm, which selects the least recently referenced block as the block to be replaced, while if the number of cache blocks stored in the write buffer 300 is higher than or equal to a certain level (k), the cache memory controller 100 proceeds to S200 and refers to the dirty bits of the tag array 210 in the cache memory 200.

At S210, the cache memory controller 100 determines whether a clean block exists based on the status of the dirty bits from S200

If the result of S210 shows no clean block exists, the cache memory controller 100 proceeds to S140 and replace a cache block by performing an LRU (Least Recently Used) algorithm. If a clean block exists, the cache memory controller 100 proceeds to S220 to determine whether there are a plurality of clean blocks.

If the result of S220 shows a plurality of clean blocks exist, the cache memory controller 100 proceeds to S240 and replace a cache block by performing a conventional LRU (Least Recently Used) algorithm for the plurality of clean blocks.

If the result of S220 shows there are not a plurality of clean blocks, the cache memory controller 100 proceeds to S230 and replace a clean block. In other words, the cache memory controller 100 replaces a cache block by storing a dirty block in the write buffer 300 and let the newly fetched block stored in the place of the replaced block.

When replacing a dirty block, in the embodiments of the present disclosure, the above-described time delay caused by the additional operations such as storing data into the write buffer can be reduced by selecting the clean block as the block to be replaced in the case that the number of cache blocks stored in the write buffer exceeds a threshold.

A 2-way set-associative cache has been described as an example of cache memory configuration of the cache memory 200 according to one embodiment of the present disclosure. However, the present disclosure may not be limited thereto. A 4-way set-associative cache, an 8-way set-associative cache, or a fully associative cache may be adopted.

Also, to explain a method for replacing a cache block according to one embodiment of the present disclosure, what has been described is performing an LRU (Least Recently Used) algorithm if the number of cache blocks stored in the write buffer 300 is lower than a certain level (k), or no dirty block exists, or all ways are dirty blocks, However, the cache replacement algorithm should not be limited to the LRU, and those having ordinary skill in the an can easily understand that other cache replacement algorithms may be adopted.

The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A cache memory system comprising:
    a set-associative cache memory operatively connected with a write buffer; and
    a cache memory controller for controlling the set-associative cache memory;
    wherein, the cache memory controller is configured to monitor whether a number of cache blocks in the write buffer meets or exceeds a predetermined threshold, to monitor whether at least one block in a set of the set-associative cache memory has been modified, and to replace a lower memory block fetched as a result of a cache miss with a cache block in the set of the set-associative cache memory using a redetermined replacement algorithm, and
    wherein if the number of cache blocks is lower than the predetermined threshold or there is no clean block in the set of the set-associative cache memory, the cache memory controller uses the predetermined replacement algorithm for all blocks of the cache memory,
    wherein if the number of cache blocks is greater than or equal to the predetermined threshold and there are a plurality of clean blocks in the set of the set-associative cache memory, the cache memory controller uses the predetermined replacement algorithm for the clean blocks of the cache memory, and
    wherein if the number of cache blocks is greater than or equal to the predetermined threshold and there is a clean block in the set of the set-associative cache memory, the cache memory controller selects the clean block as the cache block to be replaced.

2. The cache memory system of claim 1, wherein the predetermined replacement algorithm is a least recently used (LRU) algorithm.

3. A method for replacing a cache block of a set-associative cache memory, the method comprising:
    monitoring whether a number of cache blocks in a write buffer meets or exceeds a predetermined threshold;
    monitoring whether content of at least one block in a set of the set-associative cache memory has been modified; and
    replacing a lower memory block fetched as a result of a cache miss with a cache block in the set of the set-associative cache memory using a predetermined replacement algorithm,
    wherein if the number of cache blocks is lower than the predetermined threshold or there is no clean block in the set of the set-associative cache memory, the predetermined replacement algorithm is used for all blocks of the cache memory,
    wherein if the number of cache blocks is higher than or equal to the predetermined threshold and there are a plurality of clean blocks in the set of the set-associative cache memory, the predetermined replacement algorithm is used for the clean blocks of the cache memory,
    and wherein if the number of cache blocks is higher than or equal to the predetermined threshold and there is a clean block in the set of the set-associative cache memory, the clean block as the cache block to be replaced.

4. The method for replacing a cache block claimed in claim 3, wherein, the predetermined replacement algorithm policy is a least recently used (LRU) algorithm.

* * * * *

UNITED STATES PATENT AND TRADEMARK OFFICE
CERTIFICATE OF CORRECTION

PATENT NO.         : 8,930,630 B2                                      Page 1 of 1
APPLICATION NO.    : 13/376271
DATED              : January 6, 2015
INVENTOR(S)        : Gi Ho Park It is certified that error appears in the above-identified patent and that said Letters Patent is hereby corrected as shown below:

In the Claims,

Column 7, claim 1, line 29 please replace "redeterminded" with -- predeterminded --

Signed and Sealed this
Seventh Day of July, 2015

Michelle K. Lee
*Director of the United States Patent and Trademark Office*